US011557772B2

(12) United States Patent
Gretzer et al.

(10) Patent No.: US 11,557,772 B2
(45) Date of Patent: Jan. 17, 2023

(54) FUEL CELL ASSEMBLY AND CELL UNIT FOR A FUEL CELL STACK

(71) Applicant: AUDI AG, Ingolstadt (DE)

(72) Inventors: Markus Gretzer, Eichstätt (DE); Norbert Kluy, Schönfeld (DE)

(73) Assignee: AUDI AG, Ingolstadt (DE)

( * ) Notice: Subject to any disclaimer, the term of this patent is extended or adjusted under 35 U.S.C. 154(b) by 22 days.

(21) Appl. No.: 16/764,353

(22) PCT Filed: Oct. 1, 2018

(86) PCT No.: PCT/EP2018/076591
§ 371 (c)(1),
(2) Date: May 14, 2020

(87) PCT Pub. No.: WO2019/096482
PCT Pub. Date: May 23, 2019

(65) Prior Publication Data
US 2020/0280078 A1    Sep. 3, 2020

(30) Foreign Application Priority Data
Nov. 15, 2017    (DE) ...................... 10 2017 220 353.6

(51) Int. Cl.
*H01M 8/0273*    (2016.01)
*H01M 8/0258*    (2016.01)
(Continued)

(52) U.S. Cl.
CPC ....... *H01M 8/0273* (2013.01); *H01M 8/0258* (2013.01); *H01M 8/1004* (2013.01); *H01M 8/2485* (2013.01)

(58) Field of Classification Search
CPC ............. H01M 8/0273; H01M 8/0258; H01M 8/1004; H01M 8/2485
See application file for complete search history.

(56) References Cited

U.S. PATENT DOCUMENTS

| 5,514,487 A * | 5/1996 | Washington ...... H01M 8/04074 |
| | | 429/460 |
| 7,704,625 B2 * | 4/2010 | Tanaka ................ H01M 8/0267 |
| | | 429/434 |

(Continued)

FOREIGN PATENT DOCUMENTS

| DE | 197 03 214 C1 | 11/1998 |
| DE | 60 2004 002 351 T2 | 4/2007 |

(Continued)

*Primary Examiner* — Helen Oi K Conley
(74) *Attorney, Agent, or Firm* — Seed IP Law Group LLP (57) ABSTRACT

A fuel cell arrangement with a membrane electrode assembly is provided which comprises a cathode, an anode and a membrane arranged between the cathode and the anode, with an active area essentially predetermined by the membrane electrode assembly, and with a sealing structure laterally assigned to the membrane electrode assembly. The sealing structure comprises a sealing tongue extending into or over an edge region outside the active area for axially covering in a gas-tight manner a media channel formed in an adjacent bipolar plate and located in the edge region. A unit cell for a fuel cell stack with such a fuel cell arrangement is also provided.

9 Claims, 10 Drawing Sheets

(51) Int. Cl.
*H01M 8/1004* (2016.01)
*H01M 8/2485* (2016.01)

(56) References Cited

U.S. PATENT DOCUMENTS

| | | |
|---|---|---|
| 9,653,747 B2 | 5/2017 | Watanabe et al. |
| 2007/0196716 A1 | 8/2007 | Mashimo et al. |
| 2011/0318666 A1 | 12/2011 | Patterson, Jr. et al. |

FOREIGN PATENT DOCUMENTS

| | | |
|---|---|---|
| DE | 10 2010 023 021 A1 | 12/2011 |
| DE | 10 2010 024 316 A1 | 12/2011 |
| DE | 11 2007 002 574 B4 | 11/2013 |
| DE | 10 2014 104 017 A1 | 9/2015 |
| EP | 2 858 139 | 4/2015 |
| JP | S62-211868 A | 9/1987 |
| JP | 2007-287364 A | 11/2007 |
| JP | 2008-140740 A | 6/2008 |

\* cited by examiner

Fig. 17 ed in the edge region of the bipolar plate.

FUEL CELL ASSEMBLY AND CELL UNIT FOR A FUEL CELL STACK

BACKGROUND

Technical Field

Embodiments of the invention relate to a fuel cell arrangement and a unit cell for a fuel cell stack with such a fuel cell arrangement.

Description of the Related Art

In particular, a fuel cell arrangement comprises a membrane electrode assembly comprising a cathode, an anode and a membrane arranged between the cathode and the anode. The membrane electrode assembly or its dimensions essentially predetermine an active area, in which the electrochemical reaction of a fuel cell takes place. A sealing structure which in particular ensures that the reaction media can only flow where they are required for the electrochemical reaction is laterally assigned to the membrane electrode assembly.

DE 19703214 C 1 shows a fuel cell arrangement. In this case, a seal is attached to or impregnated into the edge of the cathode and the anode of the membrane electrode assembly. In order to supply a medium to the anode or the cathode, a perpendicular supply line, i.e., a supply line extending in a stacking direction, is incorporated into the membrane electrode assembly and has laterally formed openings to the cathode or the anode. This design is disadvantageous because, due to the passage extending perpendicularly through the membrane electrode assembly, the active area predetermined by the membrane electrode assembly is reduced.

In DE 10 2010 024 316 A1, a seal for a bipolar plate of a fuel cell is described, in which media inlets and outlets are formed. This seal is partly elastically deformable, so that it can be prefabricated as a separate component and the bipolar plate is pushed into the seal by temporarily stretching the seal. Instead of stretching, the seal can also be injection-molded. JP 2007 287364 A likewise describes a unit cell with a fuel cell arrangement, which comprises a sealing structure for sealing as protection against the undesired leakage of reaction medium. US 2007/196716 A1 also describes a fuel cell arrangement and a unit cell comprising a bipolar plate 25 with such a fuel cell arrangement, which has a sealing structure 23. US 2011/318 666 A1 describes a fuel cell stack, wherein the media connections are provided in areas (protrusions 214, 216, 218, 226) which project beyond the rectangular basic shape of the stack. JP S62 211 868 A1) shows that here there is a sealing structure with wings which project beyond the dimensions of the base plate. JP 2008 140 740 A) describes a fuel cell stack in which a sealing structure for distributing the operating media is used.

BRIEF SUMMARY

Embodiments described herein provide a fuel cell arrangement, with which the active area is maintained or maximized. Embodiments described herein also provide a corresponding unit cell for a fuel cell stack which can be produced particularly economically.

In particular, according to embodiments of the present invention, a fuel cell arrangement is provided with a sealing structure which comprises a sealing tongue extending into or over an edge region. The edge region is arranged outside the active area. The active area is thus bounded circumferentially by the non-active edge region, wherein the edge region is predetermined by the dimensions of an adjacent bipolar plate. The sealing tongue extending into or over the edge region is designed to axially cover in a gas-tight manner a media channel formed in the adjacent bipolar plate, located in the edge region, and extending to the edge of the bipolar plate. The edge region and the sealing tongue can be reduced to minimum dimensions, so that a lateral supply of media, such as reaction media or cooling media, i.e., a supply of media oriented perpendicularly to the stacking direction, is possible.

It has proven to be advantageous if the sealing structure, in particular its sealing tongue, is formed in a dimensionally stable manner with regard to a pressure and/or tensile load acting axially thereon. This ensures that the fuel cell arrangement can be placed onto a bipolar plate in a dimensionally stable and planar manner. If, in contrast, only the sealing tongue is designed to be dimensionally stable, a planar covering of the one or more media channels formed in an adjacent bipolar plate can be achieved in the edge region. The sealing structure is preferably formed from a plastic or a plastic mixture. In order to maintain its dimensional stability even in the case of a hot pressing process, it is advantageous if this plastic or this plastic mixture has a high thermal (dimensional) stability.

In order to ensure the sealing function of the sealing tongue, it may be expedient for the sealing tongue to extend beyond the edge region.

For the additional sealing of the cathode from the anode of the membrane electrode assembly, it is advantageous if the sealing structure has a sealing edge which laterally seals the membrane electrode assembly.

In particular, this unit cell comprises a fuel cell arrangement and a first bipolar plate arranged adjacently to the membrane electrode assembly. The first bipolar plate is likewise subdivided into an edge region and an active area, wherein it comprises at the edge region a media channel covered in an axially gas-tight manner by the sealing tongue of the fuel cell arrangement. This media channel is designed to transport a medium into or out of the active area.

Here as well, the advantage arose that the bipolar plate can be minimized in terms of area. In this case, the active surface or the active area is maintained and the edge region outside the active area can be reduced to a minimum surface. The medium in question is then supplied by a separate device, so that the bipolar plate is designed to be free of media supply lines formed in the stacking direction. The medium is supplied into the active area laterally or at the side, i.e., perpendicularly to the stacking direction of the fuel cell stack.

In order to be able to enlarge the active area even more, it is expedient if the first bipolar plate comprises a first media inlet channel and a first media outlet channel in the edge region. In the active area, a first flow field is formed in the bipolar plate and is fluidically connected to the first media inlet channel and the first media outlet channel. The sealing structure moreover comprises a sealing tongue, which extends into or over the edge region and is formed as a first inlet sealing tongue, for axially covering in a gas-tight manner the first media inlet channel. Furthermore, a sealing tongue, which extends into or over the edge region and is formed as a first outlet sealing tongue, is provided for axially covering in a gas-tight manner the first media outlet channel.

The one or more first media inlet channels and the one or more media outlet channels may be formed on the same or different edges of the bipolar plate. In a preferred embodiment, the at least one first media inlet channel is formed on a first edge of the bipolar plate and the at least one first media outlet channel is arranged on an edge of the bipolar plate opposite the first edge. In the case of an opposite arrangement of the media inlet channel and the media outlet channel, it may also be expedient for the media inlet channel to be arranged at the one edge laterally offset from the first media outlet channel at the other opposite edge.

An advantageous design of the fuel cell stack provides a second bipolar plate comprising a second media inlet channel and a second media outlet channel. The second bipolar plate also has a second flow field, which is fluidically connected to the second media inlet channel and the second media outlet channel. In addition, the sealing structure comprises a second inlet sealing tongue extending into or over the edge region for axially covering in a gas-tight manner the second media inlet channel and a second outlet sealing tongue extending into or over the edge region for axially covering in a gas-tight manner the second media outlet channel. In the case of the second bipolar plate, the media channels may also be arranged on the same or different edges.

This design has the advantage that now two different media can reach the active area via the edge region. These are preferably the two reaction media of a fuel cell system; however, it is also possible for a cooling medium to be used. Moreover, with this design, the active area can still be maximized and, with a corresponding design of the sealing tongues, the edge region can be minimized.

In order to be able to connect the first bipolar plate and the second bipolar plate to one another in an operationally reliable and gas-tight manner, it has proven to be useful if a composite layer having recesses is provided between the first bipolar plate and the second bipolar plate. This composite layer is designed to laterally seal in a gas-tight manner the active area. One or more media channels are kept free in the region of the recesses. This ensures that, as a result of the composite layer, no media channels, for example media inlet channels or media outlet channels, are sealed or blocked by the composite layer. The composite layer is to be understood here as a joining layer which is formed from a joining material for joining the first bipolar plate to the second bipolar plate. The composite layer can be applied to the bipolar plate in a U shape, thus keeping the active area free.

For additional sealing and for operationally reliable connection of the bipolar plates to the fuel cell arrangement, it has been found to be advantageous if the composite layer is formed in several parts and if the first inlet sealing tongue and the first outlet sealing tongue project over the recesses of the composite layer to form overhangs. The overhang ensures that, even in the event of a pressure or tensile load exerted in the stacking direction on the fuel cell stack, the sealing tongue is not displaced, compressed or stretched to such an extent that it could lose its sealing function.

The sealing can additionally be improved if a connecting layer forming overlaps with the composite layer is applied to the first inlet sealing tongue and to the first outlet sealing tongue. The connecting layer can also be understood as a joining layer which, on the one hand, is joined to the composite layer and, on the other hand, joins the first bipolar plate to the second bipolar plate in the region of the media channels.

BRIEF DESCRIPTION OF THE SEVERAL VIEWS OF THE DRAWINGS

Embodiments of the invention are explained in more detail below with reference to the drawings.

DETAILED DESCRIPTION

It should be noted in advance that the dimensions, proportions and scale of the illustrations shown are not specified and may vary. In particular, in the sectional illustrations, the individual layers are represented in such a way that it is possible to understand the mutual position in which and the order in which the individual layers are stacked on top of each other.

Figure 1:
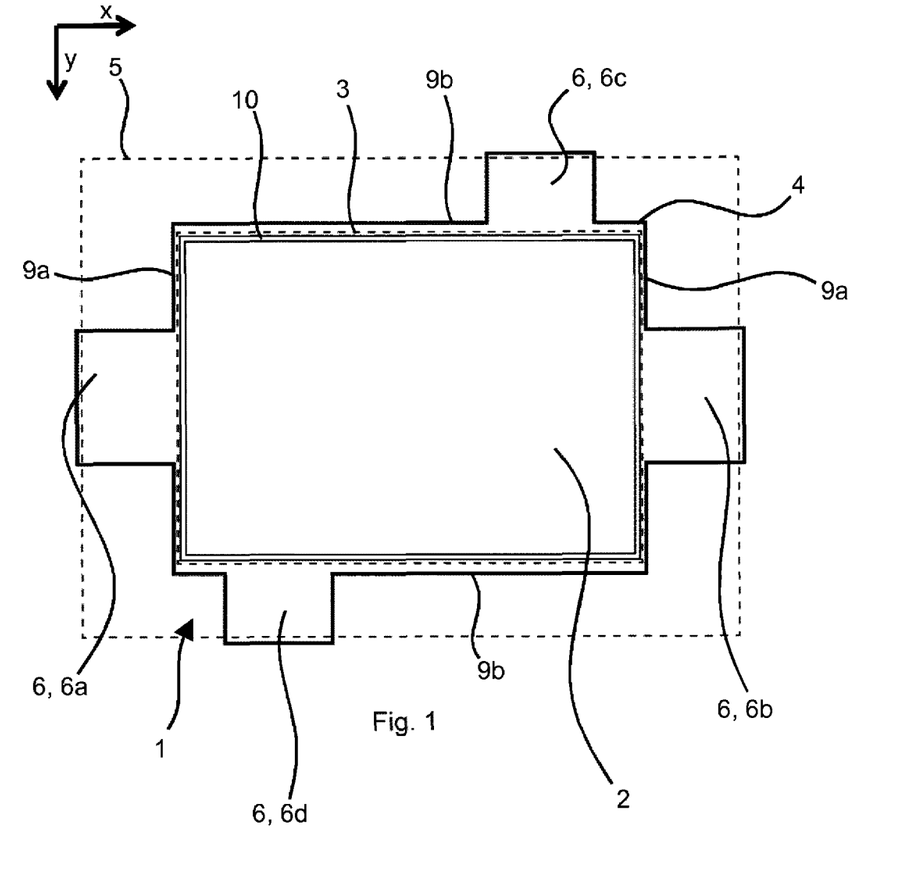
FIG. 1 illustrates a fuel cell arrangement in a plan view.

FIG. 1 shows a fuel cell arrangement 1 which comprises a membrane electrode assembly 2 arranged in its center with a cathode, an anode and a proton-conductive membrane arranged between the cathode and the anode. This membrane electrode assembly 2 essentially predetermines an active area 3, which is sketched in the figure by the inner dashed line. This active area 3 extends not only in a plane (x/y plane) but also in a stacking direction of the membrane electrode assembly 2 (z direction), which is directed out of the paper plane.

The active area 3 is the region in which the electrochemical reaction of the fuel cell formed by the membrane electrode assembly 2 takes place. In the electrochemical reaction, a fuel (e.g., hydrogen) is guided to the anode where it is catalytically oxidized to protons, releasing electrons. These protons are transported to the cathode through the ion-exchange membrane. The electrons discharged from the fuel cell preferably flow via an electrical load to an electric motor for driving a vehicle or to a battery. The electrons are then guided to the cathode. At the cathode, the oxidizing medium (e.g., oxygen or oxygen-containing air) is reduced by receiving the electrons to anions, which react directly with the protons to form water.

In order to ensure that the fuel directly reaches the cathode or that the oxidizing medium directly reaches the anode, a sealing structure 4 is laterally assigned to the membrane electrode assembly 2. Such sealing structure 4 comprises components which extend into or project beyond an edge region 5. Such components are thus arranged outside the active area 3. In other words, the edge region 5 thus delimits the active area 3 in the radial or lateral direction or circumferentially.

It can be seen that the sealing structure 4 comprises a sealing tongue 6 extending into or over the edge region 5 for axially covering in a gas-tight manner a media channel 8 formed in an adjacent bipolar plate 7 and located in the edge region 5. The fuel cell arrangement shown in FIG. 1 has a total of four sealing tongues 6. Two of the sealing tongues 6 are arranged opposite one another at the shorter edge 9a of the fuel cell arrangement 1. The other two sealing tongues 6 are arranged at the long edge 9b of the membrane electrode assembly 1 opposite one another and offset from each other. The sealing tongues 6 in the present case all have a rectangular shape. However, polygonal shapes of the sealing tongues are possible, wherein rounded sealing tongues 6 also come into consideration.

The sealing structure 4 and in particular the sealing tongues 6 are dimensionally stable with regard to a pressure and/or tensile load acting axially thereon. It can also be seen that the sealing tongues 6 extend beyond the edge region 5. However, it is also possible for one or more of the sealing tongues 6 to extend only into the edge region 5, but not to cover it completely or project laterally beyond it.

Moreover, it can be seen that the sealing structure 4 has a sealing edge 10 which laterally seals the membrane electrode assembly 2. The sealing line formed by the sealing edge 10 seals the membrane electrode assembly 2 against lateral leakage of media.

Figure 2:
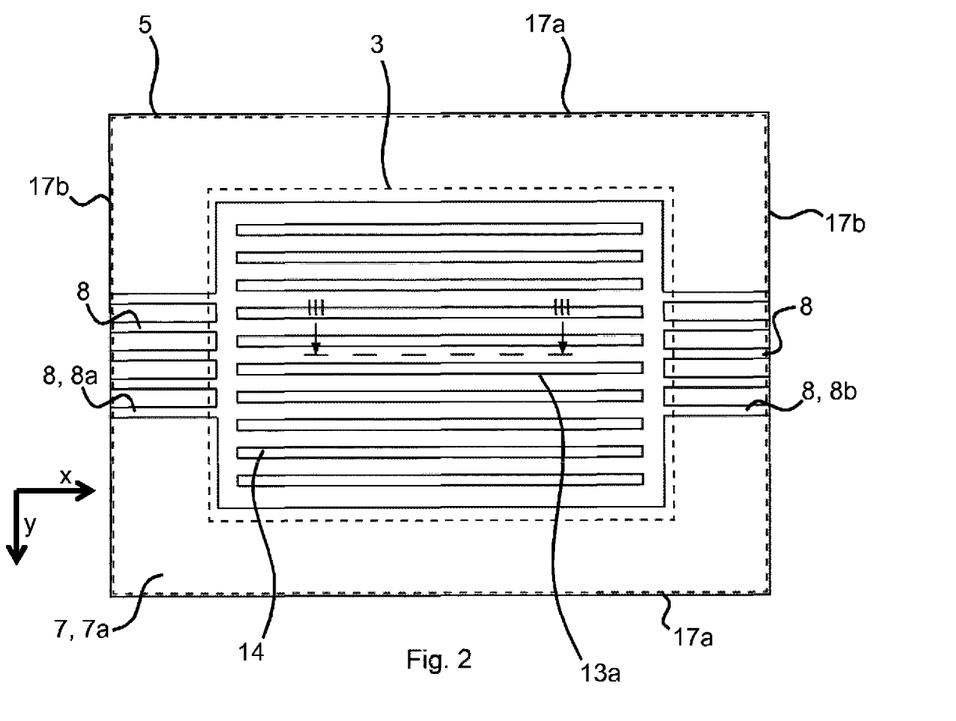
FIG. 2 illustrates a (first) bipolar plate in a plan view.

FIG. 2 shows a bipolar plate 7 by means of which a unit cell 11 for a fuel cell stack 12 can be formed together with the fuel cell arrangement 1. This first bipolar plate 7a likewise has the inner active area 3 shown in dashed lines and the outer edge region 5 shown in dashed lines. In the edge region 5, several media channels 8 are provided, which can be divided into the first media inlet channels 8a shown on the left in the drawing and the first media outlet channels 8b shown on the right in the drawing.

Here, five of the first media inlet channels 8a and five of the first media outlet channels 8b are formed in the first bipolar plate 7a. A different number is possible. The first media inlet channels 8a are fluidically connected to the first media outlet channels 8b via a first flow field 13a. This flow field 13a is located in the active area 3 and can provide a reaction medium to an adjacent membrane electrode assembly 2. In the example of FIG. 2, the flow field 13a comprises several guides or walls 14 for uniformly distributing a reaction medium over the surface of the membrane electrode assembly 2. However, it is also possible to use other types of flow fields 13a, for example ones in which the flow of the reaction medium is guided in a meandering shape over the region of the active surface. The spacing of the walls 14 or of the webs may also vary. The depth of the channel formed by adjacent walls 14 may also be of different depths and vary.

Figure 3:
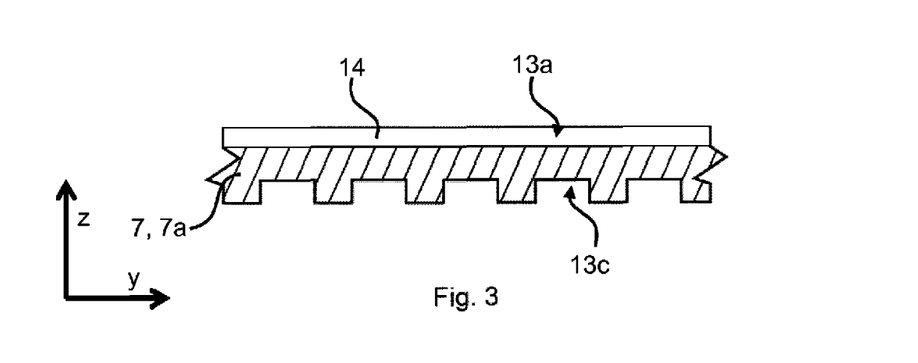
FIG. 3 illustrates the section of FIG. 2.

As can be seen in FIG. 3, the section according to FIG. 2, a flow field 13c is also formed on the side of the first bipolar plate 7a facing away from the membrane electrode assembly 2 and serves for the through-flow of another medium, e.g., a cooling medium.

Figure 4:
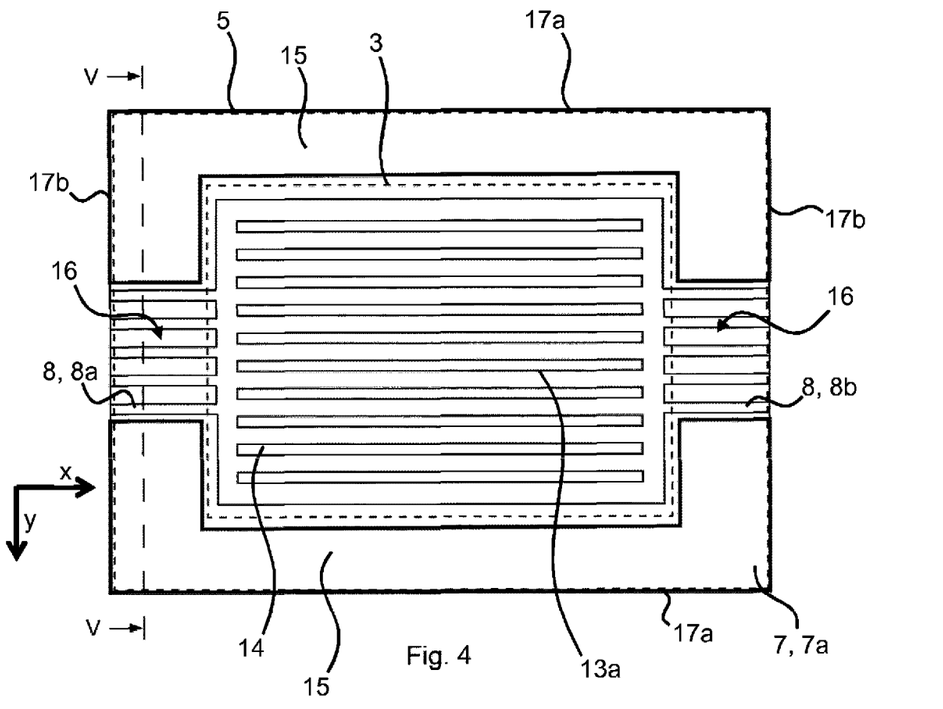
FIG. 4 illustrates the (first) bipolar plate of FIG. 2 with applied composite layer in a plan view.

As FIG. 4 shows, a composite layer 15, in particular a joining layer, is applied to the first bipolar plate 7a in the edge region 5. This composite layer 15 is formed in several parts or has recesses 16 in the region of the media channels 8a, 8b. The recesses 16 ensure that the media inlet channels 8a and the media outlet channels 8b are not sealed and permit later media guidance.

Figure 5:
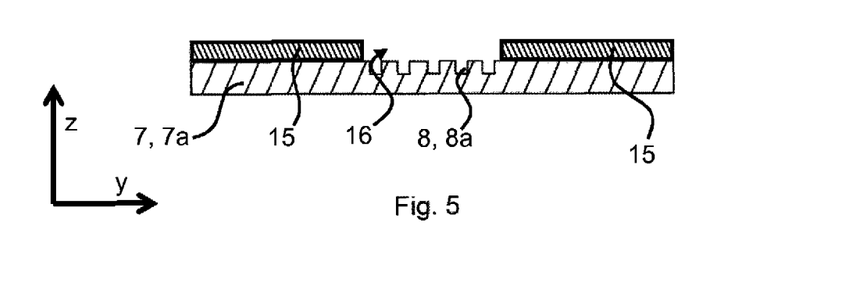
FIG. 5 illustrates the section V-V of FIG. 4.

The composite layer 15 applied in the edge region 5 extends along the long edge 17a of the first bipolar plate 7a, so that a flush end with the edge region 5 predetermined by the dimensions of the bipolar plate 7 is produced. This composite layer 15 seals the active surface or active area 3 from the environment, wherein the material of the composite layer 15 is to be selected such that this sealing function is ensured. A plastic or a plastic mixture which preferably has a lower thermal stability compared to the plastic or plastic mixture of the sealing structure 4 or of the sealing tongues 6 can be used as the material of the composite layer 15. During the hot pressing process, the sealing tongues 6 can thus sink into the composite layer 15 and preferably merge with it, wherein the sealing tongues 6 maintain their dimensional stability. In other words, the melting point of the material of the sealing structure 4 is above the melting point of the material of the composite layer 15. FIG. 5, the section V-V of FIG. 4, shows the flush end of the composite layer 15 or of the joining material with the bipolar plate 7 along its long edges 17a. The chosen representation of the composite layer 15 is exemplary. It can be designed to be much thinner than the first bipolar plate 7a.

Figure 6:
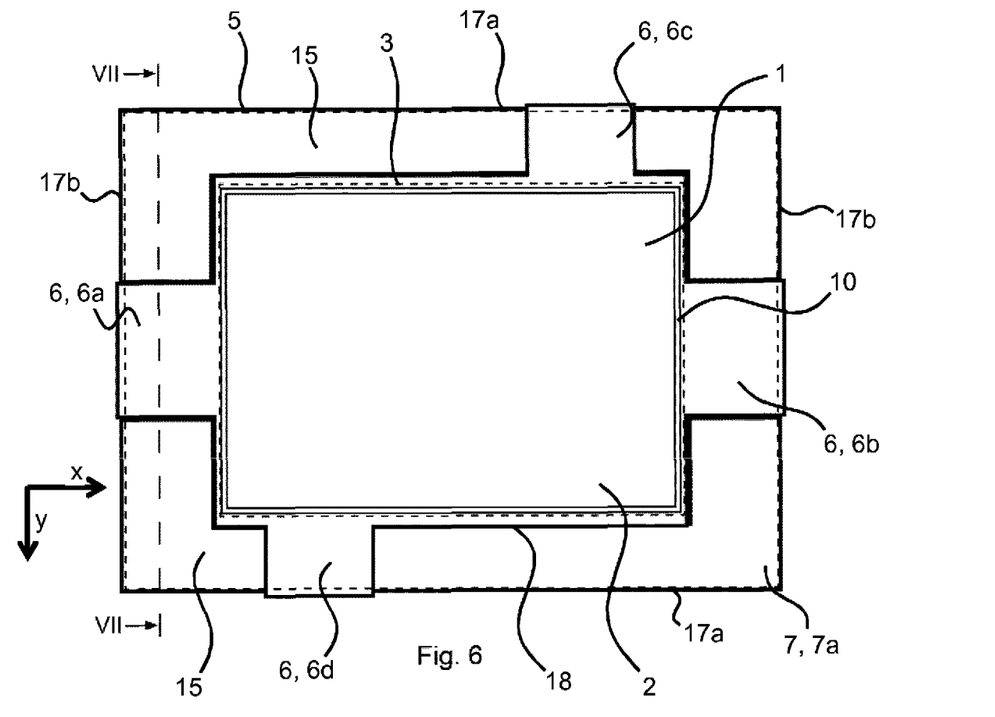
FIG. 6 illustrates a unit cell comprising the (first) bipolar plate of FIG. 4 with the fuel cell arrangement of FIG. 1 placed thereon.

In order to now form a unit cell 11 for a fuel cell stack 12, the membrane electrode assembly 2 shown in FIG. 1 is applied to or placed onto the first bipolar plate 7a according to FIG. 4 covered with the composite layer 15 (FIG. 6). The sealing tongue 6 of the fuel cell arrangement 1 on the left side covers in an axially gas-tight manner the left media channels 8 of the first bipolar plate 7a. The right sealing tongue 6 of the fuel cell arrangement 1 covers in an axially gas-tight manner the right media channels 8 of the first bipolar plate 7a. In other words, the left sealing tongue 6 is thus formed as a first inlet sealing tongue 6a for axially covering in a gas-tight manner the first media inlet channel 8a on the left. Accordingly, the right sealing tongue 6 is formed as a first outlet sealing tongue 6b for axially covering in a gas-tight manner the right first media outlet channel 8b. The sealing tongues 6 provided at the long edge 17a of the bipolar plate 7a rest on the composite layer 15. They can be divided into a second inlet sealing tongue 6c and a second outlet sealing tongue 6d. Preferably, the second sealing tongues 6c, 6d sink into the composite layer 15 when an axial pressure is exerted on the unit cell 11; for example, when (hot) pressing the unit cell 11.

In the central region, i.e., where the active area 3 is located, the sealing structure 4 of the fuel cell arrangement 1 is adapted with regard to its outer contour to the inner contour predetermined by the composite layer 15. In this case, the sealing tongue-free sections of the sealing structure 4 form contact points, contact lines 18 or contact surfaces with the composite layer, so that a sealing function is additionally ensured.

Figure 7:
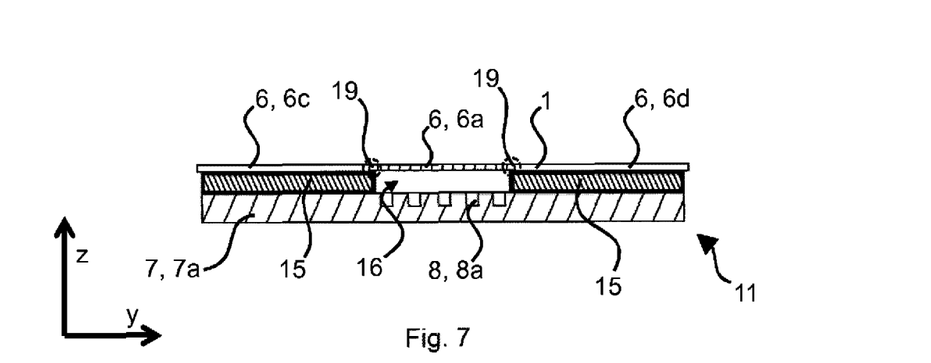
FIG. 7 illustrates the section VII-VII of FIG. 6.

In FIG. 7, the section VII-VII of FIG. 6, an uncompressed sectional view of the unit cell 11 is shown. It can be seen that the first sealing tongues 6a, 6b project beyond the composite layer 15 and form overhangs 19 therewith. The necessary sealing in the lateral direction is ensured in this case. Here, too, the illustration chosen is not to be understood as true to scale. The thicknesses of the individual layers may vary, in particular after a connecting process or joining process (hot pressing process), after which they can seem or act like a single common layer. The region of the recess 16 located between the inlet sealing tongue 6a and the channels 8 is then also minimized in such a way that the inlet sealing tongues 6a axially cover the channels 8. A medium can now be supplied to the membrane electrode assembly 2 in the stacking direction below the first inlet sealing tongue 8a. (Partially) consumed medium can then leave the unit cell 11 of the fuel cell stack 12 in the stacking direction below the first outlet sealing tongue 8b.

Figure 8:
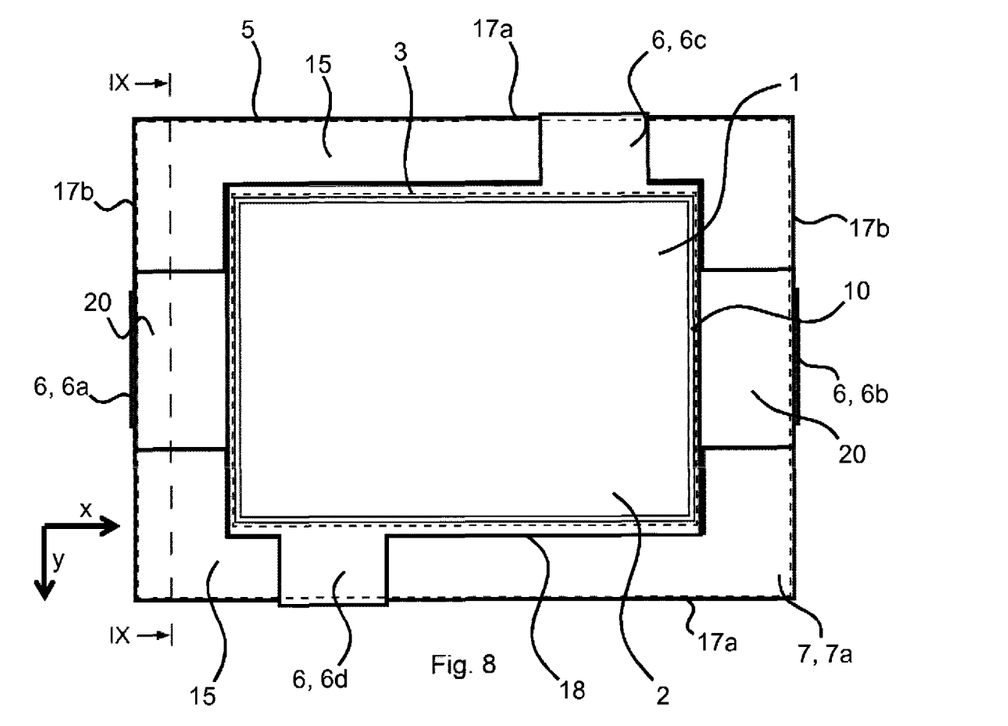
FIG. 8 illustrates the unit cell of FIG. 6 with an applied connecting layer.
Figure 9:
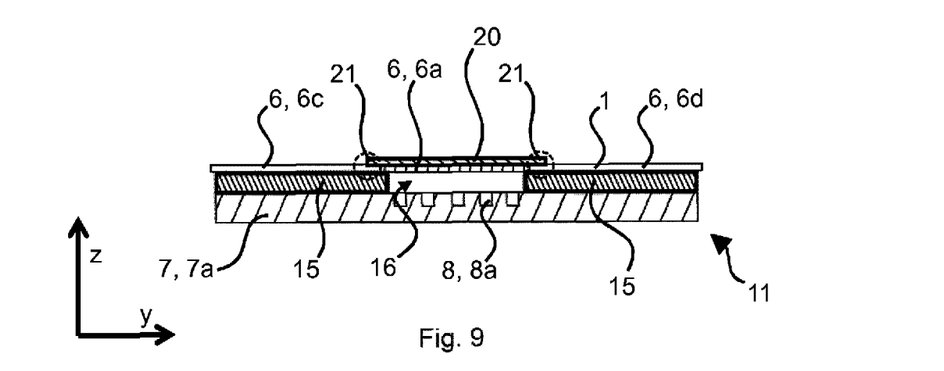
FIG. 9 illustrates the section IX-IX of FIG. 8.

In FIG. 8, a connecting layer 20 which is to be understood as a further joining layer, is applied to the first inlet sealing tongue 8a and to the first outlet sealing tongue 8b. The composite layer 15 and the connecting layer 20 ensure a secure connection of a first bipolar plate 7a in the stacking direction to a second bipolar plate 7b. The composite layer 15 forms overlaps 21 with the connecting layer 20 such that the two layers have a contact surface in the stacking direction. A sealing function is thereby ensured. The overlaps 21 can be seen in more detail in FIG. 9, the section IX-IX of FIG. 8. Here as well, a representation that is true to scale is not selected in order to illustrate the stacked arrangement of the individual layers.

Figure 10:
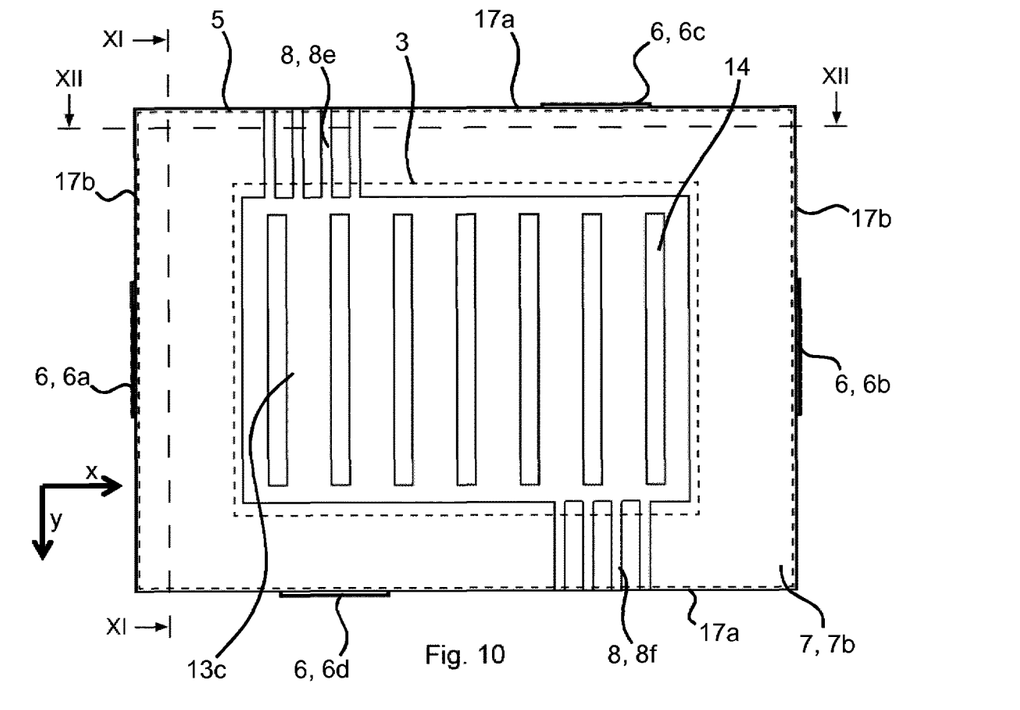
FIG. 10 illustrates a unit cell corresponding to that of FIG. 8 but comprising a second bipolar plate.

A second bipolar plate 7b can now be applied to the composite layer 15 and the connecting layer 20 connected thereto. This is shown in FIG. 10. The first bipolar plate 7a and the second bipolar plate 7b can be connected to one another by the joining layers in such a way that a unit cell, provided at most with small overhangs, of first bipolar plate 7a, fuel cell arrangement 1, and second bipolar plate 7b is produced. Like the first bipolar plate 7a, the second bipolar plate 7b shown in FIG. 10 and FIG. 13 also has on its side facing away from the membrane electrode assembly 2 a flow field 13c for guiding a cooling medium. This flow field 13c is located essentially in the active area 3. It is fluidically connected to coolant inlet channels 8e and coolant outlet channels 8f.

Figure 13:
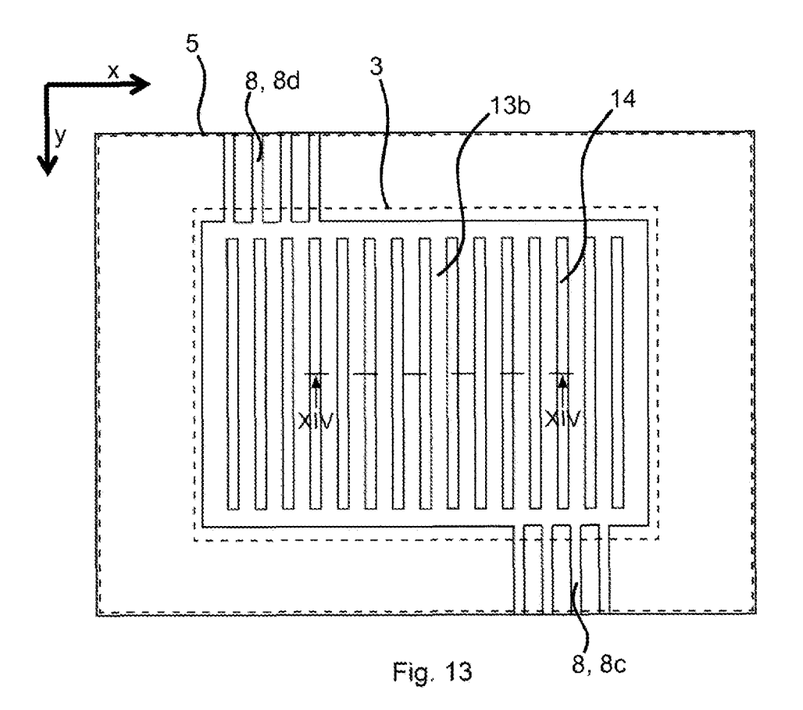
FIG. 13 illustrates the (second) bipolar plate in a bottom view, i.e., in a view of the surface of the bipolar plate facing the membrane electrode assembly.

On its side facing the membrane electrode assembly 2, however, the second bipolar plate 7b has one or more second media inlet channels 8c and one or more second media outlet channels 8d (FIG. 13). It also comprises a second flow field 13b which is fluidically connected to the second media inlet channel 8c and the second media outlet channel 8d and via which one of the reaction media can be supplied to the membrane electrode assembly 2.

Figure 11:
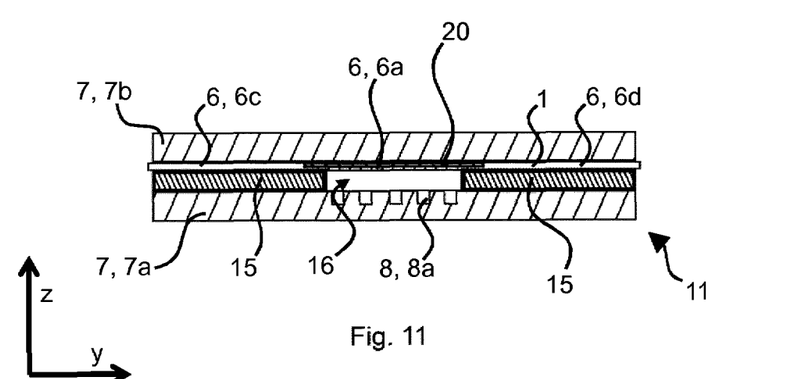
FIG. 11 illustrates the section XI-XI of FIG. 10 in an uncompressed state of the unit cell.
Figure 12:
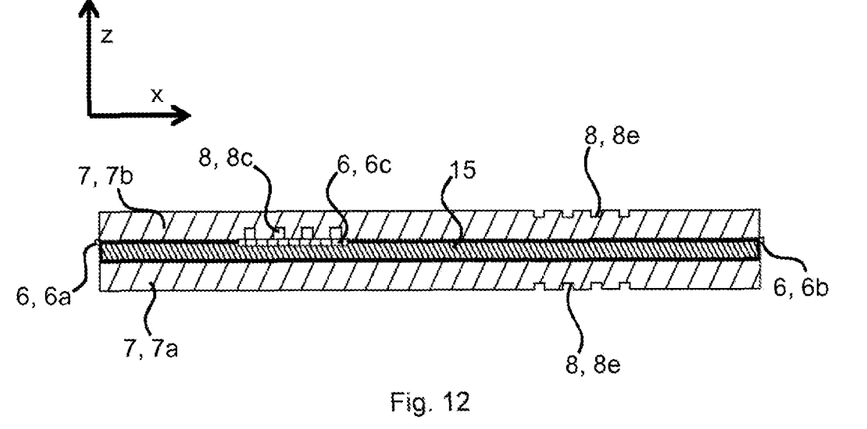
FIG. 12 illustrates the section XII-XII of FIG. 10 in a compressed state of the unit cell.

While FIG. 11, the section XI-XI of FIG. 10, shows the unit cell 11 uncompressed, FIG. 12, the section XII-XII, shows a configuration after the joining process. FIG. 11 only shows that the second bipolar plate 7a is applied to the connecting layer 20 and the composite layer 15 in the stacking direction. The two sealing tongues 6c, 6d can still be seen in the unjoined representation. In relation to the illustration of FIG. 11, they lie "further back" in comparison to the inlet sealing tongue 6a, which is why they also have no cross-hatching. After the joining or hot pressing process, the second inlet sealing tongue 6c and the second outlet sealing tongue 6d would no longer be visible in this illustration. They would preferably be embedded in the composite layer 15.

FIG. 12 shows that the composite layer 15 touches or contacts both the first bipolar plate 7a and the second bipolar plate 7b after the joining or hot pressing process, wherein the bipolar plates 7 are connected to one another or are joined to one another via the composite layer 15. It can also be seen that the second media inlet channels 8c are covered in an axially gas-tight manner by a second inlet sealing tongue 6c extending into or over the edge region 5. The same happens analogously at the opposite edge 17a of the second bipolar plate 7b, where a second outlet sealing tongue 6d extending into or over the edge region 5 is provided for axially covering in a gas-tight manner the one or more second media outlet channels 8d. In addition, FIG. 12 shows that a second reaction medium is guided in the stacking direction above the sealing structure 4 to the membrane electrode assembly 2. Correspondingly, the (partially) consumed second reaction medium is also guided out of the unit cell 11 or out of the fuel cell stack 12 again in the stacking direction above the sealing structure 4.

Figure 14:
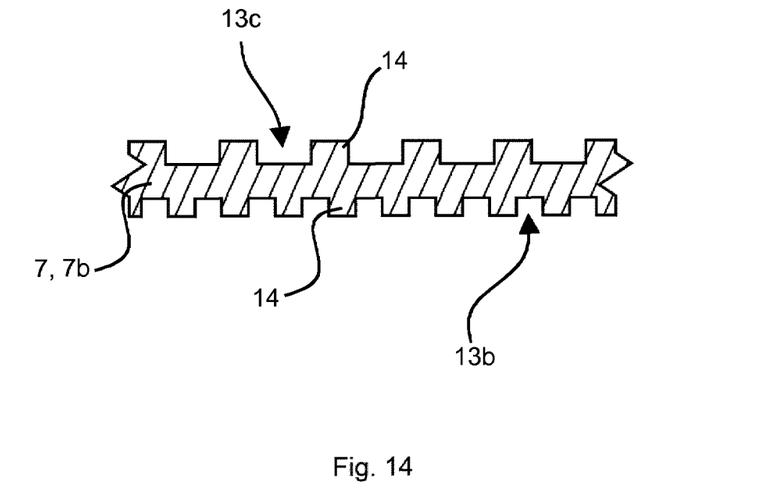
FIG. 14 illustrates the section XIV-XIV of FIG. 13 (for consistency, this section is shown rotated by 180 degrees)

FIG. 14, the section XIV-XIV of FIG. 13, again shows the coolant flow field 13c formed on the second bipolar plate 7b and facing away from the membrane electrode assembly 2.

Figure 15:
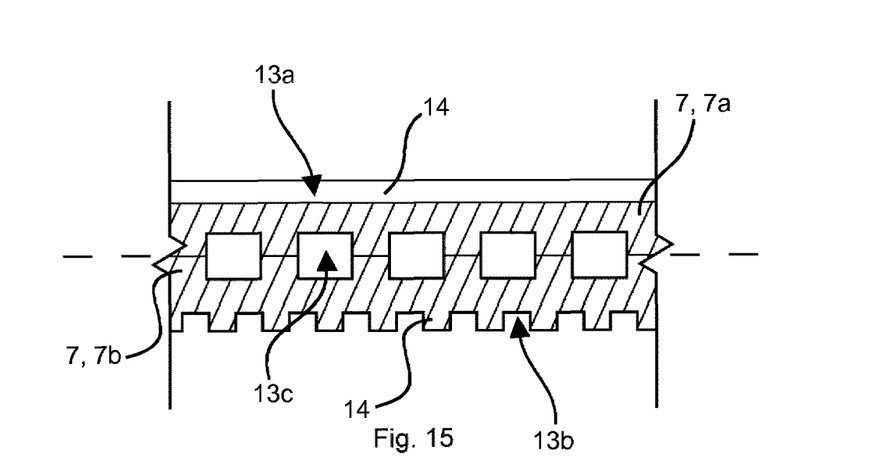
FIG. 15 illustrates a sectional view corresponding to FIG. 14 of a first bipolar plate and a second bipolar plate arranged adjacently to the first bipolar plate.

In FIG. 15, it can be seen that the second bipolar plate 7b of a first unit cell 11 with a first bipolar plate 7a of a further unit cell 11 then forms the complete channel cross-section for the passage of the cooling medium. The second bipolar plate 7b of the first unit cell 11 and the first bipolar plate 7a of the further unit cell 11 can also be joined to one another using a joining means or joining medium.

The present design makes it possible to design the edge region 5 as narrow as possible, in order to save expensive material of the bipolar plates 7. The selected configuration nevertheless ensures the reliable sealing of each individual cell 11 and allows the active area 3 to be maximized in comparison to known unit cells.

Figure 16:
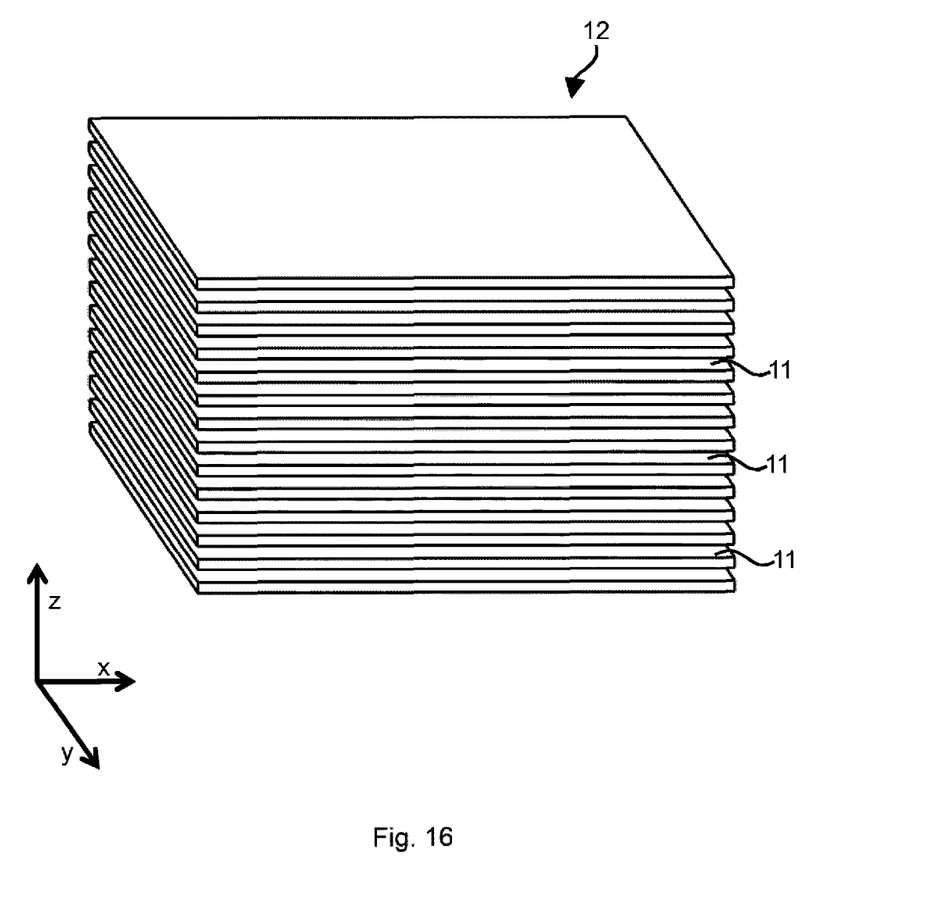
FIG. 16 illustrates a fuel cell stack having a plurality of unit cells according to FIG. 10 in a perspective view.

FIG. 16 shows, by way of example, a fuel cell stack 12 formed from several unit cells 11. Such fuel cell stack 12 has the advantage that the bipolar plates 7 can be designed with smaller dimensions in comparison to known bipolar plates, so that the production costs of the fuel cell stack 12 are reduced. In the present case, the bipolar plates 7 are rectangular in shape, but are also applicable without limitation to any shapes with, for example, round or curved line layouts.

Since channels formed in the stacking direction or perpendicularly within the bipolar plates 7 can be dispensed with, it is possible to radially or laterally guide the reaction media and/or the cooling medium to or from the individual cells or unit cells.

Figure 17:
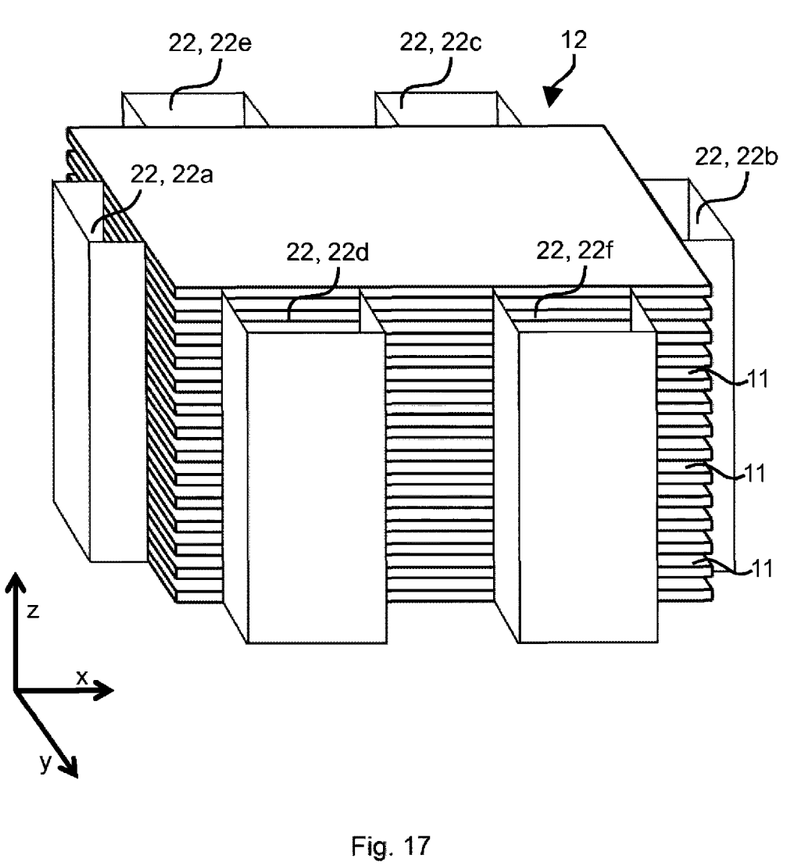
FIG. 17 illustrates the fuel cell stack of FIG. 16 with media guides laterally attached to the stack.

A possible arrangement of media guides 22 is shown in FIG. 17. Media guides 22 extending in the stacking direction and attached laterally to the fuel cell stack 12 are provided here. Such media guides 22 can be formed from a different material than the bipolar plates 7, as a result of which the fuel cell stack 12 can be produced in a correspondingly economical manner. For example, the two media guides 22a, 22b arranged at the short edge of the unit cells guide an anode gas (or hydrogen) to or from the anode chambers or the anode of the membrane electrode assembly 2. The media guide 22c at the rear right, for example, guides a cathode gas to the cathode chambers or the cathode of the membrane electrode assembly 2, while the (partially) consumed cathode gas is guided out of the media guide 22d again at the long edge of the bipolar plates 7 at the front left. The media guides 22e, 22f at the long edge at the rear left and at the long edge at the front right serve to supply and discharge a cooling medium between the second bipolar plate 7b of a first unit cell 11 and the first bipolar plate 7a of a second unit cell 11 arranged adjacently to the first unit cell 11.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell arrangement, comprising:
a membrane electrode assembly comprising a cathode, an anode and a membrane arranged between the cathode and the anode;
an active area essentially predetermined by the membrane electrode assembly and in which an electrochemical reaction of a fuel cell takes place; and
a sealing structure which is laterally assigned to the membrane electrode assembly and is designed in such a way that reaction media flow only to where the reaction media are required for the electrochemical reaction;
wherein the sealing structure has a sealing edge which laterally seals the membrane electrode assembly;
wherein an edge region is present which is predetermined by the dimensions of an adjacent bipolar plate and delimits the active area circumferentially;
wherein the sealing structure comprises a plurality of sealing tongues, each sealing tongue extending into or over the edge region outside the active area for axially covering in a gas-tight manner a media channel which is formed in the adjacent bipolar plate, wherein the media channel is located in the edge region, extends to the edge of the bipolar plate, and is designed to transport a medium laterally into or out of the active area;
wherein the sealing structure does not extend laterally outward from the sealing edge across the edge region except at the sealing tongues.

2. The fuel cell arrangement according to claim 1, wherein the sealing structure is formed in a dimensionally stable manner with regard to a pressure and/or tensile load acting axially thereon.

3. The fuel cell arrangement according to claim 1, wherein the sealing tongues extend beyond the edge region.

4. A unit cell for a fuel cell stack, with a fuel cell arrangement according to claim 1 and with a first bipolar plate, which is arranged adjacently to the membrane electrode assembly and which comprises on the edge region a media channel which is covered in an axially gas-tight manner by one of the sealing tongues, extends to the edge of the bipolar plate, and is designed to transport a medium laterally into or out of the active area.

5. The unit cell according to claim 4, wherein:
the first bipolar plate comprises in the edge region a first media inlet channel and a first media outlet channel;
the first bipolar plate comprises in the active area a first flow field fluidically connected to the first media inlet channel and the first media outlet channel;
and the sealing structure comprises a first inlet sealing tongue extending into or over the edge region for axially covering in a gas-tight manner the first media inlet channel and a first outlet sealing tongue extending into or over the edge region for axially covering in a gas-tight manner the first media outlet channel.

6. The unit cell according to claim 5, wherein:
a second bipolar plate is provided, which comprises a second media inlet channel and a second media outlet channel;
the second bipolar plate comprises a second flow field fluidically connected to the second media inlet channel and the second media outlet channel;
and the sealing structure comprises a second inlet sealing tongue extending into or over the edge region for axially covering in a gas-tight manner the second media inlet channel and a second outlet sealing tongue extending into or over the edge region for axially covering in a gas-tight manner the second media outlet channel.

7. The unit cell according to claim 6, wherein a composite layer having recesses is provided between the first bipolar plate and the second bipolar plate and is designed to laterally seal in a gas-tight manner the active area.

8. The unit cell according to claim 7, wherein the composite layer is formed of several parts, and the first inlet sealing tongue and the first outlet sealing tongue project over the recesses of the composite layer to form overhangs.

9. The unit cell according to claim 8, wherein a connecting layer forming overlaps with the composite layer is applied to the first inlet sealing tongue and to the first outlet sealing tongue.

* * * * *